United States Patent
Heyne et al.

(10) Patent No.: US 10,766,374 B2
(45) Date of Patent: Sep. 8, 2020

(54) MOTOR VEHICLE CHARGING CABLE

(71) Applicant: Dr. Ing. h.c. F. Porsche Aktiengesellschaft, Stuttgart (DE)

(72) Inventors: Raoul Heyne, Wiernsheim (DE); Jari Rönfanz, Mühlacker (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 16/571,462

(22) Filed: Sep. 16, 2019

(65) Prior Publication Data

US 2020/0086751 A1 Mar. 19, 2020

(30) Foreign Application Priority Data

Sep. 17, 2018 (DE) .................. 10 2018 122 680

(51) Int. Cl.

| | |
|---|---|
| *H01B 7/282* | (2006.01) |
| *B60L 53/18* | (2019.01) |
| *B60L 53/302* | (2019.01) |
| *H01B 7/42* | (2006.01) |
| *H01B 9/00* | (2006.01) |

(52) U.S. Cl.
CPC .............. *B60L 53/18* (2019.02); *B60L 53/302* (2019.02); *H01B 7/2825* (2013.01); *H01B 7/423* (2013.01); *H01B 9/003* (2013.01); *H01B 9/006* (2013.01)

(58) Field of Classification Search
USPC ...................... 174/11 R, 14 R, 15 C; 165/105
See application file for complete search history.

(56) References Cited

U.S. PATENT DOCUMENTS

| | | | | |
|---|---|---|---|---|
| 1,917,129 | A | * | 7/1933 | Kirch ........................ G01K 5/32 |
| | | | | 374/152 |
| 2,686,215 | A | * | 8/1954 | Fondiller .................. H01B 7/29 |
| | | | | 174/15.6 |
| 3,461,218 | A | * | 8/1969 | Buchhold .............. H01B 12/12 |
| | | | | 174/15.5 |

(Continued)

FOREIGN PATENT DOCUMENTS

| | | |
|---|---|---|
| CN | 106782835 A | 5/2017 |
| CN | 206741986 U | 12/2017 |

(Continued)

*Primary Examiner* — Binh B Tran
*Assistant Examiner* — Krystal Robinson
(74) *Attorney, Agent, or Firm* — RatnerPrestia

(57) ABSTRACT

A motor vehicle charging cable for direct current charging of an electric energy storage device of a vehicle, having a cable jacket, a first electric conductor for a first direct current phase and a second electric conductor for a second direct current phase. The electric conductors are surrounded on the outside by the cable jacket. The electric conductors each have a conductor sheath including an outer and an inner sheathing layer. The electric conductors each have conductor cores extending within the conductor sheath and forming a conductor core strand. The electric conductors each have a first coolant duct for cooling the respective conductor core strand from the inside, which duct is surrounded by the respective conductor cores. The electric conductors furthermore each have a second coolant duct for cooling the respective conductor core strand from the outside. The second coolant duct encloses the respective conductor cores.

13 Claims, 2 Drawing Sheets

(56) References Cited

U.S. PATENT DOCUMENTS

| | | | | |
|---|---|---|---|---|
| 3,483,313 A * | 12/1969 | Schaffhauser | H01B 7/12 | 174/101.5 |
| 3,526,086 A * | 9/1970 | Morgan | F16L 11/22 | 138/111 |
| 3,603,718 A * | 9/1971 | Gedenk | H01B 9/0611 | 174/47 |
| 3,604,833 A * | 9/1971 | Beck | H01B 12/08 | 174/15.5 |
| 3,643,002 A * | 2/1972 | Minnich | H01B 12/06 | 174/15.5 |
| 3,699,237 A * | 10/1972 | Melia | H01B 7/12 | 174/101.5 |
| 3,715,453 A * | 2/1973 | Aupoix | H01B 12/16 | 174/125.1 |
| 3,723,634 A * | 3/1973 | Aupoix | H01B 12/14 | 174/15.5 |
| 3,725,581 A * | 4/1973 | Gillemot | H02G 15/043 | 174/38 |
| 3,736,364 A * | 5/1973 | Kubo | H01B 7/423 | 174/11 R |
| 3,749,811 A * | 7/1973 | Bogner | H01B 12/06 | 174/15.5 |
| 3,780,205 A * | 12/1973 | Aupoix | F16L 9/18 | 174/15.4 |
| 3,784,732 A * | 1/1974 | Whitfill, Jr. | B29C 63/00 | 174/108 |
| 3,872,232 A * | 3/1975 | Goodman | H01B 9/001 | 174/19 |
| 3,947,622 A * | 3/1976 | Graneau | H01B 12/14 | 174/15.5 |
| 3,962,529 A * | 6/1976 | Kubo | H01B 7/29 | 174/15.6 |
| 4,176,238 A * | 11/1979 | Vulis | H01B 12/02 | 174/125.1 |
| 4,184,042 A * | 1/1980 | Vulis | H01B 12/02 | 174/125.1 |
| 4,385,021 A * | 5/1983 | Neeley | H01B 7/0072 | 138/111 |
| 5,362,921 A * | 11/1994 | Birkelund | G02B 6/4427 | 174/47 |
| 5,591,937 A * | 1/1997 | Woody | H01B 7/423 | 174/5 R |
| 5,902,958 A * | 5/1999 | Haxton | H01B 7/0072 | 174/47 |
| 5,909,099 A * | 6/1999 | Watanabe | H01F 38/14 | 320/108 |
| 6,350,947 B1 * | 2/2002 | Bertini | H01B 7/2813 | 174/47 |
| 6,472,614 B1 * | 10/2002 | Dupont | H01B 7/0072 | 138/110 |
| 6,710,243 B2 * | 3/2004 | Kao | H01B 3/441 | 174/113 C |
| 6,713,673 B2 * | 3/2004 | Kao | H01B 11/12 | 174/113 C |
| 6,844,490 B2 * | 1/2005 | Nassi | H01B 12/02 | 174/125.1 |
| 6,864,417 B2 * | 3/2005 | Bechis | H02G 15/34 | 174/15.1 |
| 9,536,640 B2 * | 1/2017 | Islam | G02B 6/4471 | 307/147 |
| 10,029,575 B2 | 7/2018 | Remisch | | |
| 10,109,392 B2 * | 10/2018 | Maunder | H01B 7/041 | |
| 10,636,546 B2 * | 4/2020 | Sato | H01B 7/421 | |
| 2001/0002773 A1 * | 6/2001 | Hyogo | H01B 9/003 | 307/147 |
| 2006/0048966 A1 * | 3/2006 | Takahashi | H01B 11/1025 | 174/108 |
| 2008/0257579 A1 * | 10/2008 | Hirose | H01B 12/06 | 174/15.5 |
| 2009/0178825 A1 * | 7/2009 | Wu | H01B 7/425 | 174/113 R |
| 2012/0082422 A1 * | 4/2012 | Sarchi | G01K 11/32 | 385/101 |
| 2012/0091144 A1 * | 4/2012 | Baumgartner | H01B 12/16 | 220/560.04 |
| 2012/0199390 A1 * | 8/2012 | Oka | H01B 7/423 | 174/70 R |
| 2013/0269966 A1 * | 10/2013 | Emme | H01B 7/423 | 174/15.6 |
| 2014/0221213 A1 * | 8/2014 | Fukuda | H02G 1/081 | 505/163 |
| 2015/0041171 A1 * | 2/2015 | Heggdal | G02B 6/442 | 174/15.6 |
| 2015/0217654 A1 * | 8/2015 | Woo | H02J 7/0029 | 320/109 |
| 2017/0338006 A1 * | 11/2017 | Gontarz | B60L 53/14 | |
| 2019/0221330 A1 * | 7/2019 | Fuehrer | B60L 53/18 | |
| 2019/0237218 A1 * | 8/2019 | Heyne | B60L 53/18 | |
| 2019/0315239 A1 | 10/2019 | Beimdieck et al. | | |

FOREIGN PATENT DOCUMENTS

| | | |
|---|---|---|
| CN | 207425394 U | 5/2018 |
| DE | 102015120048 A1 | 5/2017 |
| DE | 102016112306 A1 | 1/2018 |
| EP | 3493224 A1 | 6/2019 |
| JP | 09082145 A * | 3/1997 |
| WO | 2018021401 A1 | 2/2018 |
| WO | 2018155895 A1 | 8/2018 |

* cited by examiner

MOTOR VEHICLE CHARGING CABLE

CROSS-REFERENCE TO RELATED APPLICATION

This application claims priority to German Patent Application No. 10 2018 122 680.2, filed Sep. 17, 2018, the content of such application being incorporated by reference herein in its entirety.

FIELD OF THE INVENTION

The invention relates to a motor vehicle charging cable.

BACKGROUND OF THE INVENTION

DE 10 2015 120 048 A1, which is incorporated by reference herein, discloses a motor vehicle charging cable for direct current charging of an electric energy storage device of a motor vehicle. A motor vehicle charging cable having a first electric conductor for a first direct current phase and a second electric conductor for a second direct current phase are thus known from this prior art, wherein the two electric conductors are surrounded by a cable jacket of the charging cable. Each of the two electric conductors has a conductor sheath designed as an insulating layer, wherein conductor cores of the respective electric conductor extend in the insulating layer of the respective electric conductor. A coolant duct, in which a cooling fluid for cooling the respective electric conductor can be carried, is formed between the respective insulating layer and the respective conductor cores of the respective electric conductor. In this case, the coolant flows around the respective conductor cores of the respective electric conductor, and accordingly said cores are cooled externally.

SUMMARY OF THE INVENTION

A motor vehicle charging cable for direct current charging of an electric energy storage device of a vehicle, having a cable jacket, having a first electric conductor for a first direct current phase and a second electric conductor for a second direct current phase, wherein the first and second electric conductors are surrounded on the outside by the cable jacket, wherein the first and second electric conductors each have a conductor sheath comprising an outer sheathing layer and an inner sheathing layer, wherein the first and second electric conductors each have conductor cores extending within the conductor sheath and forming a conductor core strand, wherein the first and second electric conductors each have a first coolant duct for cooling the respective conductor core strand from the inside, which duct is surrounded by the respective conductor cores, wherein the first and second electric conductors furthermore each have a second coolant duct for cooling the respective conductor core strand from the outside, said strand enclosing the respective conductor cores, wherein tubular spacers which divide the respective second coolant duct, through and around which coolant flows, and which, on the one hand, rest against one another and, on the other hand, rest against the inner sheathing layer of the conductor sheath of the respective electric conductor, are positioned between the conductor cores of the conductor core strand of the respective electric conductor and the inner sheathing layer of the conductor sheath of the respective electric conductor. The motor vehicle charging cable has improved cooling.

In the motor vehicle charging cable according to aspects of the invention, the first and second electric conductors are surrounded jointly on the outside by the cable jacket.

In the motor vehicle charging cable according to aspects of the invention, the first and second electric conductors each have a conductor sheath comprising an outer sheathing layer and an inner sheathing layer.

Moreover, the first and second electric conductors of the motor vehicle charging cable according to aspects of the invention each have conductor cores extending within the conductor sheath and forming a conductor core strand.

Furthermore, the first and second electric conductors of the motor vehicle charging cable according to aspects of the invention each have a first coolant duct for cooling the respective conductor core strand from the inside, which duct is surrounded by the respective conductor cores.

Moreover, the first and second electric conductors of the motor vehicle charging cable according to aspects of the invention each have a second coolant duct for cooling the respective conductor core strand from the outside, said strand enclosing the respective conductor cores, wherein tubular spacers, which divide the respective second coolant duct, through and around which coolant flows, and which, on the one hand, rest against one another and, on the other hand, rest against the inner sheathing layer of the conductor sheath of the respective electric conductor and preferably also against the conductor cores of the conductor core strand, are positioned between the conductor cores of the conductor core strand of the respective electric conductor and the inner sheathing layer of the conductor sheath of the respective electric conductor.

In the motor vehicle charging cable according to aspects of the invention, each electric conductor or conductor core strand is cooled from the inside and from the outside.

The respective first coolant duct serves to cool the respective electric conductor or conductor core strand consisting of conductor cores from the inside. The respective second coolant duct, which is divided by the tubular spacers through and around which coolant flows, serves to cool the respective electric conductor or conductor core strand consisting of conductor cores from the outside.

By means of the embodiment or design according to aspects of the invention of the motor vehicle charging cable, improved, more effective cooling of the electric conductors of the motor vehicle charging cable is possible.

According to an advantageous development of the invention, the coolant can flow through the first coolant duct of the respective electric conductor of the motor vehicle charging cable in a first direction and can flow through the second coolant duct of the respective electric conductor of the motor vehicle charging cable in an opposite, second direction, wherein the first and the second coolant duct of the respective electric conductor define a conductor-specific cooling circuit of the respective electric conductor of the motor vehicle charging cable. The respective first coolant duct and the respective second coolant duct form a conductor-specific cooling circuit for the respective electric conductor. By means of the respective conductor-specific cooling circuit, the conductor core strand consisting of conductor cores of the respective electric conductor is cooled both from the inside and from the outside, namely from the inside by means of the respective first coolant duct, which preferably serves as a feed, and from the outside by means of the respective second coolant duct, which preferably serves as a return. Particularly effective cooling of the electric conductors of a motor vehicle charging cable is thereby possible.

According to an advantageous development, respectively adjacent tubular spacers rest loosely against one another (i.e., without deforming each other). The tubular spacers furthermore rest against the inner sheathing layer of the conductor sheath of the respective electric conductor, preferably with an adhesive action, for which purpose the inner sheathing layer is coated with an adhesive agent on a side facing the spacers. Particularly effective cooling of the electric conductors of a motor vehicle charging cable is thereby possible.

According to an advantageous development of the invention, the inner sheathing layer of the conductor sheath of the respective electric conductor consists of a coolant-impermeable aluminum composite foil, preferably an aluminum-PET composite foil. This prevents coolant which flows around the tubular spacers flowing over the conductor sheath of the respective electric conductor. This too serves for particularly effective cooling of the electric conductors of a motor vehicle charging cable.

BRIEF DESCRIPTION OF THE DRAWINGS

Preferred developments of the invention will be found in the dependent claims and the following description. Illustrative embodiments of the invention are explained in greater detail by means of the drawing, without being restricted thereto. In the drawing:

DETAILED DESCRIPTION OF THE INVENTION

The invention relates to a motor vehicle charging cable for direct current charging of an electric energy storage device of a motor vehicle.

Figure 1:
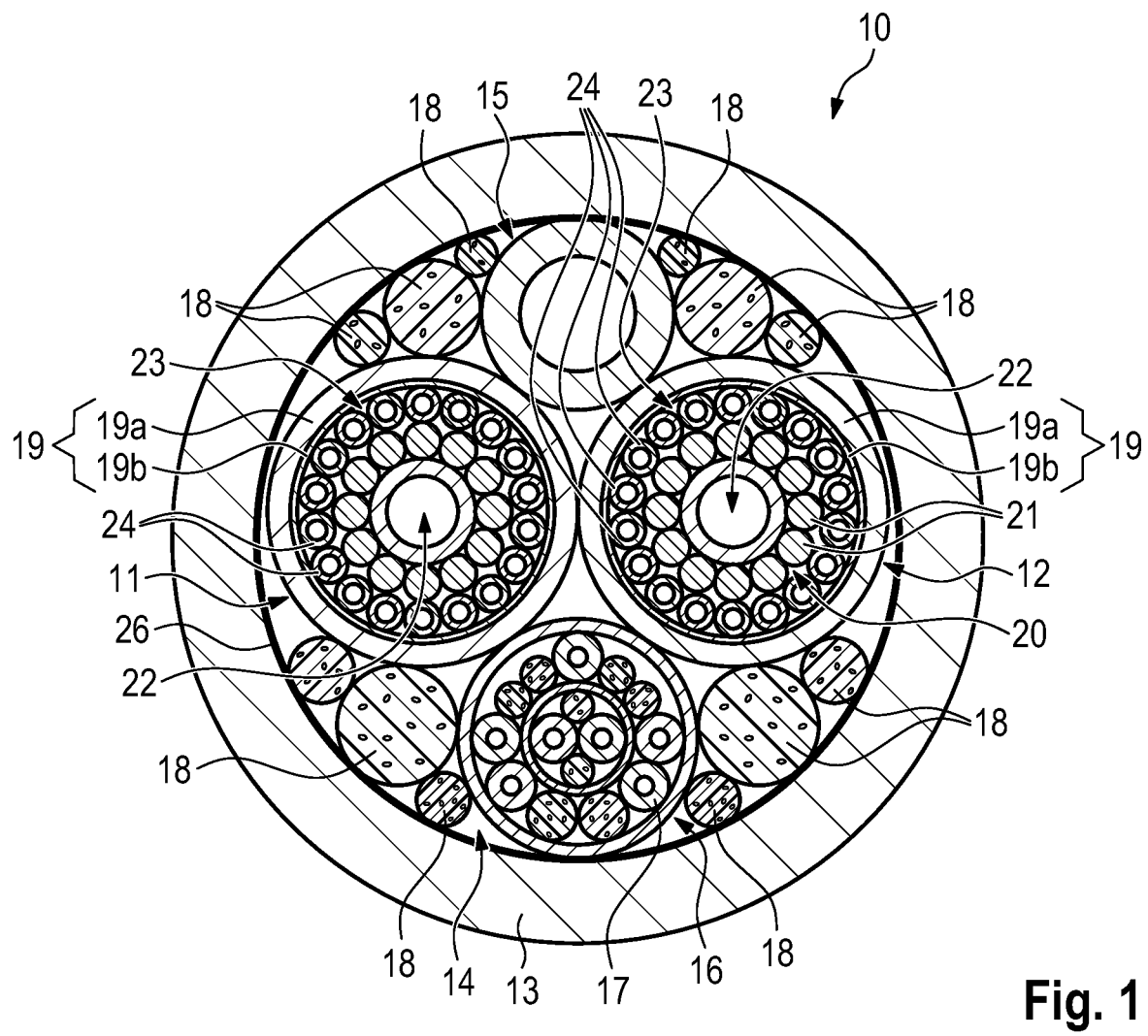
FIG. 1 shows a highly schematized cross section through a motor vehicle charging cable.

FIG. 1 shows a highly schematized cross section through a motor vehicle charging cable 10. The motor vehicle charging cable 10 has a first electric conductor 11 for a first direct current phase and a second electric conductor 12 for a second direct current phase. The two electric conductors 11, 12 are surrounded by a cable jacket 13.

In the illustrative embodiment shown in FIG. 1, it is not only the two electric conductors 11, 12 for the two direct current phases which are positioned within a cavity 14, defined by the cable jacket 13, of the motor vehicle charging cable 10; on the contrary, a ground conductor 15, a control conductor 16 having a plurality of control lines 17 and filling elements 18 preferably also extend within this cavity 14 in the illustrative embodiment shown in FIG. 1. The filling elements 18 are preferably cylindrical foam elements.

The filling elements 18 fill a free space between the cable jacket 13, the electric conductors 11, 12, the control conductor 16 and the ground conductor 15 in such a way that both the control conductor 16 and the ground conductor 15 rest loosely against the electric conductors 11, 12, and furthermore the electric conductors 11, 12 also rest loosely against one another. Relative movement between the elements positioned in the cavity 14 of the motor vehicle charging cable 10, i.e. between the electric conductors 11, 12, the control conductor 16, the ground conductor 15 and the filling elements 18, is therefore limited.

The first electric conductor 11 and the second electric conductor 12 each have a conductor sheath 19 comprising an outer sheathing layer 19a and an inner sheathing layer 19b.

The respective outer sheathing layer 19a is preferably a sheathing layer made of plastic, in particular an outer sheathing layer 19a made of PE (polyethylene).

The inner sheathing layer 19b, which adjoins the outer sheathing layer 19a of the conductor sheath 19 of the respective electric conductor 11, 12 on the inside, is preferably a coolant-impermeable aluminum composite foil, preferably an aluminum-PET (polyethylene terephthalate) composite foil.

The aluminum composite foil, which provides the inner sheathing layer 19b of the conductor sheath 19 of the respective electric conductor 11, 12, is preferably coated with an adhesive layer on a side facing the outer sheathing layer 19a, and therefore the two sheathing layers 19a, 19b of the conductor sheath 19 of the respective electric conductor 11, 12 adhere to one another.

Figure 2:
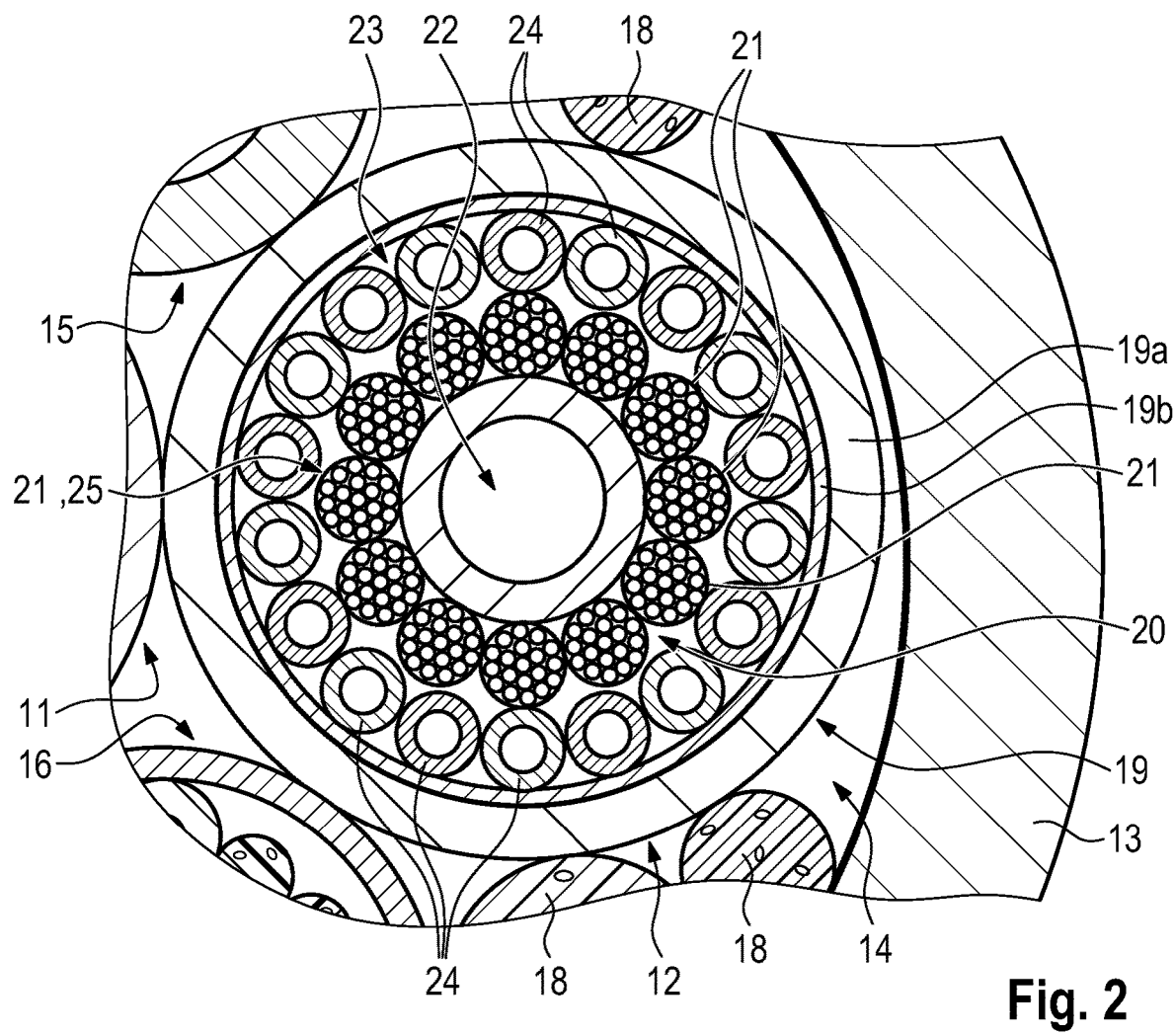
FIG. 2 shows a detail of the motor vehicle charging cable in FIG. 1.

Each of the two electric conductors 11, 12 has a conductor core strand 20 positioned within the respective conductor sheath 19 and comprising a plurality of conductor cores 21, wherein each of the electric conductors 11, 12 comprises a total of twelve conductor cores 21 in the illustrative embodiment shown in FIG. 1. This number can also be different. Each of these conductor cores 21 comprises a plurality of core wires 25, which are preferably twisted (see FIG. 2).

Each of the two electric conductors 11, 12 has a first coolant duct 22 for cooling the conductor core strand 20 of the respective electric conductor 11, 12 from the inside, wherein this first, inner coolant duct 22 is surrounded by the conductor cores 21.

The conductor cores 21 are preferably twisted around the first, inner coolant duct 22, which is defined by a tube or hose.

Each of the two electric conductors 11, 12 furthermore has a second coolant duct 23 for cooling the respective conductor core strand 20 of the respective electric conductor 11, 12 from the outside, wherein this second coolant duct 23 surrounds the conductor cores 21 of the respective electric conductor 11, 12 from the outside.

In this arrangement, a plurality of tubular spacers 24, which divide the respective second, outer coolant duct 23, through and around which the coolant flows, and which, on the one hand, rest against one another and, on the other hand, rest against the inner sheathing layer 19b of the conductor sheath 19 of the respective electric conductor 11, 12 and preferably also against the conductor cores 21 of the respective electric conductor 11, 12, are positioned between the conductor cores 21 and the inner sheathing layer 19b of the conductor sheath 19 of the respective electric conductor 11, 12. In the illustrative embodiment shown in FIG. 1, each of the electric conductors 11, 12 comprises a total of eighteen tubular spacers 24. This number can also be different.

Coolant flows through the first, inner coolant duct 22 of the respective electric conductor 11, 12 of the motor vehicle charging cable 10 according to aspects of the invention in a first direction, and said duct preferably forms a coolant feed.

By means of the first, inner coolant duct 22, the conductor cores 21 of the respective electric conductor 11, 12 can be cooled from the inside.

Coolant flows through the second, outer coolant duct 23 of the respective electric conductor 11, 12 of the motor vehicle charging cable 10 in an opposite, second direction, and said duct preferably forms a coolant return. Coolant which flows through the second, outer coolant duct 23 cools the conductor cores 21 of the respective electric conductor 11, 12 directly or indirectly from the outside.

The conductor cores 21 of the respective electric conductor 11, 12 preferably do not have an insulating layer and are therefore free from an insulating layer, thus enabling the coolant in the second, outer coolant duct 23 to flow around them directly.

By means of the second, outer coolant duct 23, the conductor cores 21 of the respective electric conductor 11, 12 can be cooled from the outside.

The first, inner coolant duct 22 and the second, outer coolant duct 23 of the respective electric conductor 11, 12 define a conductor-specific cooling circuit for the respective electric conductor 11, 12, namely for the conductor cores 21 thereof.

Each electric conductor 11, 12 is cooled singly or individually, namely from the inside and the outside, by means of a specific cooling circuit.

The tubular spacers 24 through which coolant flows and around which coolant flows rest against the inner sheathing layer 19b of the conductor sheath 19 of the respective electric conductor 11, 12 and against the conductor cores 21 of the respective electric conductor 11, 12, wherein the spacers 24 preferably rest with an adhesive action against the inner sheath 19b of the conductor sheath 19 of the respective electric conductor 11, 12.

For this purpose, the aluminum composite foil which provides the inner sheathing layer 19b of the conductor sheath 19 of the respective electric conductor 11, 12 is preferably coated with an adhesive layer on a side facing away from the outer sheathing layer 19a.

Adjacent spacers 24 each rest loosely against one another. The spacers 24 likewise rest loosely against the conductor cores 21 and are preferably twisted around the conductor cores 21.

To cool the conductor cores 21 of each electric conductor 11, 12, coolant can accordingly be passed as a feed through the inner, first coolant duct 22 in order to cool the conductor cores 21 from the inside.

In the region of one end of the motor vehicle charging cable 10, namely in the region of a motor-vehicle end thereof, the coolant passed through the first coolant duct 22 can be diverted into the second, outer coolant duct 23 in order then to carry the coolant back as a return, via the second coolant duct 23, from the motor-vehicle end of the motor vehicle charging cable 10 in the direction of a charging-pillar end of the motor vehicle charging cable 10.

In the region of the second coolant duct 23, the coolant flows through the coolant duct 23 in such a way during this process that the coolant flows through and around the spacers 24. Here, the inner sheathing layer 19b of the conductor sheath 19 of the respective electric conductor 11, 12 prevents coolant leaving the respective electric conductor 11, 12 via the conductor sheath 19.

The cable jacket 13 closes off the motor vehicle charging cable 10 from the outside and defines the cavity 14 for accommodating the electric conductors 11, 12, the control conductor 16, the ground conductor 15 and the filling elements 18. An aluminum-PET composite foil 26 can optionally be applied to a side of the cable jacket 13 which faces the cavity 14.

The motor vehicle charging cable 10 according to aspects of the invention can be cooled in a particularly effective manner, thus enabling heat to be dissipated in an effective manner from the motor vehicle charging cable 10. As a result, the motor vehicle charging cable 10 is suitable especially for high charging capacities.

Appended herewith are the claims. The numerals in the claims are not intended to be limiting in any respect, and are provided for convenience only.

What is claimed is:

1. A motor vehicle charging cable (10) for direct current charging of an electric energy storage device of a vehicle, said charging cable comprising:
a cable jacket (13),
a first electric conductor (11) for a first direct current phase; and
a second electric conductor (12) for a second direct current phase,
wherein an outside of both the first and second electric conductors (11, 12) is surrounded by the cable jacket (13),
wherein the first and second electric conductors (11, 12) each have a conductor sheath (19) comprising an outer sheathing layer (19a) and an inner sheathing layer (19b),
wherein the first and second electric conductors (11, 12) each have conductor cores (21) extending within the conductor sheath (19) and forming a conductor core strand (20),
wherein the first and second electric conductors (11, 12) each have a first coolant-carrying duct (22) for cooling the respective conductor core strand (20) from an inside of the respective conductor core strand, which first coolant-carrying duct is surrounded by the respective conductor cores (21),
wherein the first and second electric conductors (11, 12) furthermore each have a second coolant-carrying duct (23) for cooling the respective conductor core strand (20) from outside of the respective conductor core strand, said second coolant-carrying duct (23) enclosing the respective conductor cores (21),
wherein the second coolant-carrying duct (23) comprises tubular coolant-carrying spacers (24) that are positioned between the conductor cores (21) of the conductor core strand (20) of the respective electric conductor (11, 12) and the inner sheathing layer (19b) of the conductor sheath (19) of the respective electric conductor (11, 12),
wherein the tubular coolant-carrying spacers (24) divide the respective second coolant duct (23), through and around which coolant flows, rest against one another and rest against the inner sheathing layer (19b) of the conductor sheath (19) of the respective electric conductor (11, 12) and also rest directly against the conductor cores (21) for cooling the conductor cores (21).

2. The motor vehicle charging cable as claimed in claim 1, wherein the cable is configured to permit the flow of coolant through the first coolant-carrying duct (22) of the respective electric conductor (11, 12) in a first direction and permit the flow of fluid through the second coolant-carrying duct (23) of the respective electric conductor (11, 12) in an opposite, second direction, wherein the first and the second coolant-carrying duct (22, 23) of the respective electric conductor (11, 12) define a conductor-specific cooling circuit of the respective electric conductor (11, 12).

3. The motor vehicle charging cable as claimed in claim 2, wherein the first coolant-carrying duct (22) defines a coolant feed, and the second coolant-carrying duct (23) defines a coolant return.

4. The motor vehicle charging cable as claimed in claim 1, wherein respectively adjacent tubular spacers (24) rest loosely against one another.

5. The motor vehicle charging cable as claimed in claim 1, wherein the tubular spacers (24) rest with an adhesive action against the inner sheathing layer (19b) of the conductor sheath (19) of the respective electric conductor (11, 12), wherein the inner sheathing layer (19b) is coated with an adhesive agent on a side facing the spacers (24).

6. The motor vehicle charging cable as claimed in claim 1, wherein the conductor cores (21), which each comprise a plurality of core wires (25), are twisted around the first coolant-carrying duct (22).

7. The motor vehicle charging cable as claimed in claim 1, wherein the tubular spacers (24) are twisted around the conductor cores (21).

8. The motor vehicle charging cable as claimed in claim 1, wherein the inner sheathing layer (19b) of the conductor sheath (19) comprises a coolant-impermeable aluminum composite foil.

9. The motor vehicle charging cable as claimed in claim 8, wherein the coolant-impermeable aluminum composite foil is an aluminum polyethylene terephthalate composite foil.

10. The motor vehicle charging cable as claimed in claim 1, further comprising:
   a control conductor (16) having a plurality of control lines (17),
   a ground conductor (15) and a plurality of filling elements (18) arranged within the cable jacket (13) in addition to the first and second electric conductors (11, 12),
   wherein the filling elements (18) fill out a free space between the cable jacket (13), the electric conductors (11, 12), the control conductor (16) and the ground conductor (15) in such a way that both the control conductor (16) and the ground conductor (15) rest against the electric conductors (11, 12).

11. The motor vehicle charging cable as claimed in claim 10, wherein the electric conductors (11, 12) also rest against one another.

12. The motor vehicle charging cable as claimed in claim 10, wherein the control conductor (16) and the ground conductor (15) rest loosely against the electric conductors (11, 12).

13. The motor vehicle charging cable as claimed in claim 12, wherein the electric conductors (11, 12) also rest loosely against one another.

* * * * *